US009032425B1

(12) United States Patent
Madanapalli et al.

(10) Patent No.: US 9,032,425 B1
(45) Date of Patent: May 12, 2015

(54) SYSTEM AND METHOD TO BOOST APPLICATION PERFORMANCE BY USING A PROXY FOR EXECUTING SYNCHRONOUS APPLICATION PROGRAMMING INTERFACE CALLS

(71) Applicant: VMware, Inc., Palo Alto, CA (US)

(72) Inventors: Narendra Madanapalli, Bangalore (IN); Arunkumar Kambivelu, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/259,191

(22) Filed: Apr. 23, 2014

(30) Foreign Application Priority Data

Mar. 12, 2014 (IN) .......................... 1314/CHE/2014

(51) Int. Cl.
*G06F 13/00* (2006.01)
*G06F 9/54* (2006.01)
(52) U.S. Cl.
CPC ..................................... *G06F 9/541* (2013.01)
(58) Field of Classification Search
CPC ....................................................... G06F 9/541

USPC ........................................................ 719/328
See application file for complete search history.

(56) References Cited

U.S. PATENT DOCUMENTS

| 7,886,311 B2* | 2/2011 | Yao et al. ........................ 719/328 |
| 2008/0082569 A1* | 4/2008 | Mansour et al. ............... 707/102 |
| 2008/0127055 A1* | 5/2008 | Davis et al. ................... 717/106 |
| 2008/0148261 A1* | 6/2008 | Ferlitsch ....................... 718/101 |

\* cited by examiner

*Primary Examiner* — Andy Ho

(57) ABSTRACT

Techniques are described for utilizing synchronous APIs which normally block callers until a result is returned. In particular, the techniques described herein enable an application or other programming construct to boost performance by executing synchronous APIs (e.g., long running time APIs) within a proxy container rather than executing the synchronous APIs in the context of the application itself. Since the proxy is a separate process or thread, the caller application is thereby released from waiting for the synchronous API call and may proceed with other processing instead of waiting for the synchronous API to return. The application may then monitor the proxy to determine whether a result has been received, such as by periodically polling the proxy.

20 Claims, 5 Drawing Sheets

Application Context

```
Application ()
{
        retObj = MonitorProxy (apiFuncName, argsToApiFunc)
}

MonitorProxy (apiFuncName, apiFuncArguments)
{
        1. handleToProxy = Create Proxy; //Proxy runs concurrently or in parallel with application
        2. handleToProxy.run (apiFuncName, argsToApiFunc);
        3. proxyTimedOut = Monitor (handleToProxy, monitorCycles, monitorInterval);
        4. retObj = None
        5. if not proxyTimedOut:
                5.1 retObj = handleToProxy.recv ();
        6. return retObj;
}

Monitor (handleToProxy, monitorCycles, monitorInterval)
{
        1. For i from 1 to monitorCycles
                a. If handleToProxy.isRunning():
                        i. Sleep (monitorInterval);
                b. Else
                        ii. Break
        2. proxyTimedOut = false
        3. retObj = None
        4. If i > MonitorCycles + 1
                a. If proxy is running:
                        i. proxyTimedOut = true
                        ii. kill proxy;
        5. return proxyTimedOut;
}
```

Proxy Context

```
Run (aitFuncName, argsToApiFunc)
{
        1. retObj = apiFuncName (apiFuncArguments);
        2. send (retObj);
}
```

FIG. 2

SYSTEM AND METHOD TO BOOST APPLICATION PERFORMANCE BY USING A PROXY FOR EXECUTING SYNCHRONOUS APPLICATION PROGRAMMING INTERFACE CALLS

RELATED APPLICATIONS

Benefit is claimed under 35 U.S.C. 119(a)-(d) to Foreign application Serial No. 1314/CHE/2014 filed in India entitled "A SYSTEM AND METHOD TO BOOST APPLICATION PERFORMANCE BY USING A PROXY FOR EXECUTING SYNCHRONOUS APPLICATION PROGRAMMING INTERFACE CALLS", filed on Mar. 12, 2014, by VMware. Inc., which is herein incorporated in its entirety by reference for all purposes.

BACKGROUND

In the context of computer software, an application programming interface (API) specifies how two or more applications communicate with one another. APIs are very common in today's software, allowing otherwise heterogeneous objects or applications to interact, utilize each other's functionality and to generally be compatible with each other. In a typical scenario, one application invokes the functionality of another application by making a call against that application's API, which it exposes.

APIs can generally be divided into synchronous APIs and asynchronous APIs. Synchronous APIs block the caller of the API until a result of the call is returned to the caller. This results in the caller having to wait for the result before proceeding with other processing. Asynchronous APIs, on the other hand, return immediately and the actual status is returned at the end after the API completion through a callback or can be polled periodically by the caller, depending on the API implementation.

Both synchronous and asynchronous APIs can be useful and have applicability in different areas. For example, asynchronous APIs can be useful in cases where the task performed takes more time than is required for the caller to wait. The application utilizing asynchronous APIs would typically need to follow certain programming techniques to support asynchronous APIs. Synchronous APIs should generally be faster than asynchronous and the majority of APIs tend to be synchronous. There is no absolute rule to specify which type of API is the most suitable since it often depends on the context and scale of the environment. A thorough analysis should be performed to decide upon which type of API to implement for the particular environment at hand.

There are many cases when developers select the wrong or less-optimal types of API in their implementation. For example, some developers simply utilize synchronous APIs due to unseen scenarios, lack of foresight and the like. Furthermore, especially in large scale environments, synchronous APIs may block callers due to various factors such as system slowdowns, larger than expected data sizes and others. Some applications end up using many third-party modules or APIs, over which the developer has no control. Some of these third party APIs may be well written to handle all use cases, while others may not. If the third party API was not written correctly, the calling application may end up waiting indefinitely for the synchronous API and since the calling application has no control over the third party code, such problems are often difficult to resolve.

BRIEF DESCRIPTION OF THE DRAWINGS

FIG. 2 illustrates an example of a possible algorithm to implement the execution of a synchronous API in a proxy, in accordance with various embodiments;

DETAILED DESCRIPTION

Systems and methods in accordance with various embodiments of the present disclosure provide more efficient ways to utilize synchronous APIs which normally block callers until a result is returned. In particular, embodiments described herein enable an application or other programming construct to boost performance by executing synchronous APIs (e.g., long running time APIs) within a proxy container rather than executing the synchronous APIs in the context of the application itself. Since the proxy is a separate process or thread, the caller application is thereby released from waiting for the synchronous API call and may proceed with other processing instead of waiting for the synchronous API to return.

Once the application has initiated the API call in the proxy, the application can monitor the proxy for a period of time to determine when the result of the invocation is returned. For example, the application may periodically poll the proxy after a designated time interval to check whether a result is available. If the proxy receives the result, the result can be provided to the application. If, on the other hand, the proxy has not received the result from the synchronous API after a maximum number of polls, the application may terminate the proxy and consider it having timed out.

Various embodiments can provide a number of advantages. For example, the execution of the synchronous API within a proxy can boost the application performance and provide more control over synchronous APIs. One scenario in which the techniques may be particularly useful is when a developer is utilizing a third party library or operating system library whose API is synchronous, its types are generated dynamically, the synchronous APIs are blocking while fetching properties of some objects and the APIs themselves do not provide any timeout parameters. The embodiments described herein can support terminating threads and running a function as a process due to dynamic types. As such, some embodiments would rely on sub-process as a proxy in those instances.

Figure 1:
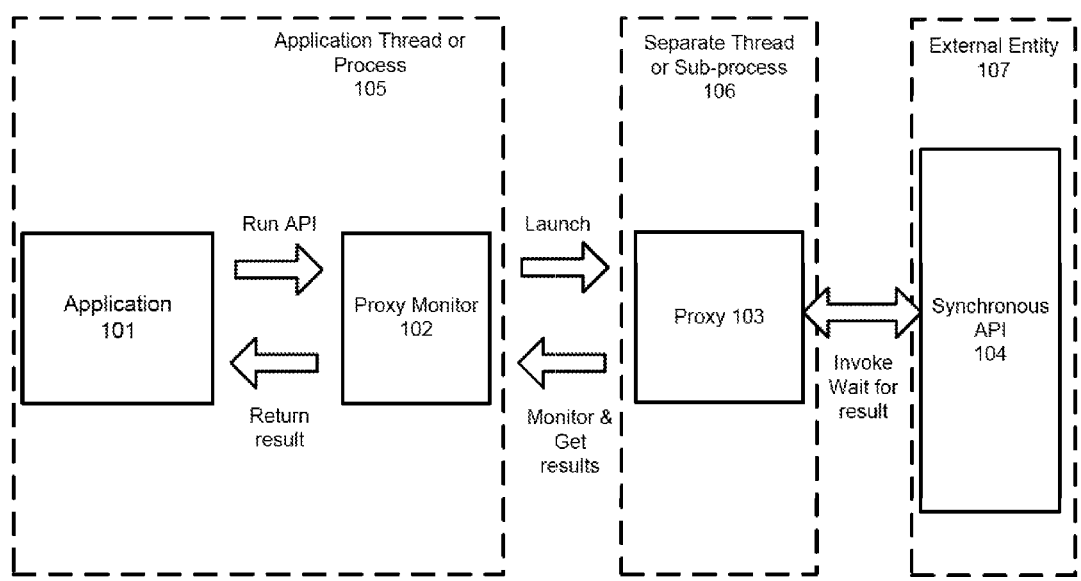
FIG. 1 illustrates an example of using a proxy to execute synchronous API calls, in accordance with various embodiments.

FIG. 1 illustrates an example of using a proxy to execute synchronous API calls, in accordance with various embodiments. As illustrated in this example, the application 101 uses a proxy monitor 102 to maintain control over the proxy 103 which will be responsible for executing the invocation of the synchronous API 104. The proxy monitor 102 is executed in the same process or thread of execution 105 as the application 101, while the proxy 103 is executing as a separate thread or sub-process 106.

In the illustrated embodiment, when an application needs to make a call to a synchronous API 104 (e.g., a third party API), the application first invokes the proxy monitor 102. In some embodiments, the proxy may pass to the proxy monitor 102 a set of parameters to use with the proxy. For example, the application 101 may specify the time interval to wait before polling the proxy 103 for a result and also specify the maximum number of monitoring cycles that the monitor 102 should wait before considering the proxy 103 as timed out and terminating the proxy 103.

Once the application 101 invokes the proxy monitor 102, the proxy monitor 102 instantiates the proxy 103 and obtains a handle to the proxy 103 which it can use to communicate inputs and results with the proxy 103. The proxy 103 runs concurrently (in parallel) with the application 101, in a separate thread or process of execution. Once the proxy 103 has been instantiated and is running, the application is released to perform any other processing that might be needed. The proxy 103 invokes the synchronous API 104 and is blocked until receiving a result from the synchronous API 104. As such, the proxy 103 waits for a result from the API 104, while the proxy monitor 102 continuously monitors the proxy 103 to check whether the proxy 103 has received a result from the API 104. For example, the proxy monitor 102 may periodically poll the proxy 103 to determine whether the proxy 103 has received a result from the synchronous API 104. If the proxy 103 has not received the result after a predetermined period of time, the proxy 103 can be considered timed out and be terminated by the proxy monitor 102.

FIG. 2 illustrates an example of a possible algorithm to implement the execution of a synchronous API in a proxy, in accordance with various embodiments. The algorithm illustrated can help the application gain control over long-running synchronous APIs and improve its response time. It should be noted that the particular algorithm is shown only for purposes of illustration and not every possible embodiment contained within this disclosure will be limited to this particular algorithm. It will apparent to one of ordinary skill in the art that the execution of synchronous APIs in a proxy can be implemented using different algorithms in light of the techniques described in this specification.

In this particular implementation, the monitor proxy algorithm utilizes two parameters: (1) Monitor Interval and (2) Monitor Cycles. The Monitor Interval parameter specifies a period of time that the monitor will sleep before polling the proxy. The Monitor Cycles parameter specifies the maximum number of times to poll the proxy before timing out the API. As such, the timeout of the API (i.e., maximum running time of the synchronous API) can be represented by Monitor Interval multiplied by Monitor Cycles.

As illustrated in FIG. 2, the normal invocation of the API call is deferred to a proxy, which in turn is monitored in the application until the proxy is terminated gracefully (i.e., returns a result) or until the proxy reaches its timeout period. The application launches a proxy, gets a handle to it, and uses this handle to communicate inputs and fetch results (if any). Proxy runs concurrently or in parallel with the application when it is launched. From this point on, the application requests proxy for API execution by passing API information and the required arguments to passed to the API. In the illustration of FIG. 2, the API information is comprised of the API function name (i.e., apiFuncName) and the arguments to the API call (i.e., argsToApiFunc). After the API is invoked, the application's Monitor call monitors the proxy until its completion. If Monitor determines that the proxy terminated gracefully, the return object is collected and assigned to the memory location as if the return object is returned from API. Further, if the proxy terminated gracefully, the application can use the same proxy for other API execution rather than creating a new proxy for every API execution. If, on the other hand, the Monitor determines that the proxy has exceeded its timeout period, the Monitor terminates the proxy and intimates the application as if the API execution failed. Once proxy timeout occurs, new proxy creation can be performed whenever another synchronous API is to be executed.

In various embodiments, the term "proxy" or "proxy container" are used interchangeably herein and should be broadly interpreted to mean any thread, child or sub-process, depending on the implementation and the programming language being used. For example, C, C++ and Java programming languages can use threads as they support thread terminating interfaces, whereas the Python language does not provide support for this feature and therefore a sub-process can be utilized or multiprocessing with custom Picklers can be used instead.

Figure 3:
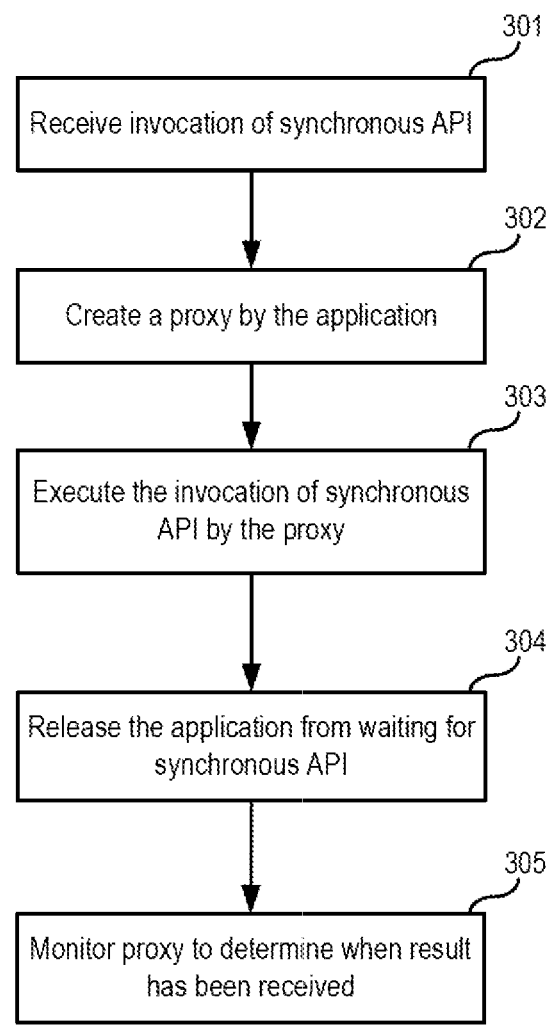
FIG. 3 illustrates an example of a process that can be utilized to execute a synchronous API call within a proxy, in accordance with various embodiments.

FIG. 3 illustrates an example of a process that can be utilized to execute a synchronous API call within a proxy, in accordance with various embodiments. As illustrated in operation 301, the application may receive an invocation of a synchronous API. The synchronous API is configured to block a caller of the invocation until a result of the invocation is returned. In operation 302, the application creates a proxy that will responsible for executing the invocation of the synchronous API. As part of creating the proxy, the application may pass several parameters to the proxy, such as the time interval and maximum number of cycles to poll the proxy for results. In operation 303, the synchronous API call is executed by the proxy. As previously mentioned, the proxy executes concurrently with the application but in a separate process or thread from the application. In operation 304, as a result of invoking the synchronous API via the proxy, the application is released from waiting for the synchronous API to complete. The application is thus free to perform other processing while the proxy waits for the result. In addition, the application can monitor the proxy for results, as shown in operation 305.

Figure 4:
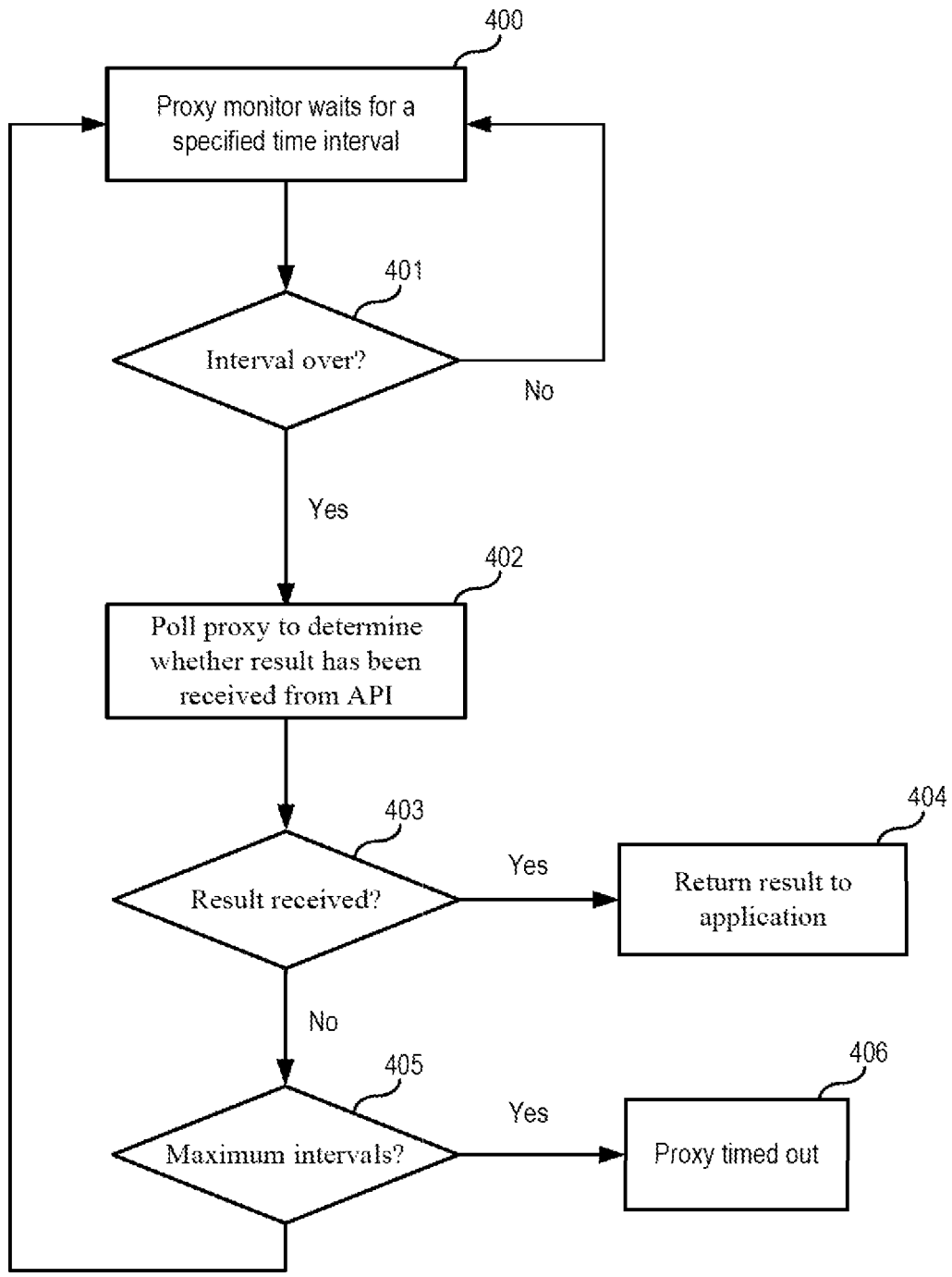
FIG. 4 illustrates an example of a process for monitoring the proxy that is responsible for executing the synchronous API calls, in accordance with various embodiments.

FIG. 4 illustrates an example of a process for monitoring the proxy that is responsible for executing the synchronous API calls, in accordance with various embodiments. As illustrated in operation 400, the proxy monitor waits for a specified interval before polling the proxy for results. For example, the proxy monitor may wait for the period of time specified by the parameter passed from the application, as previously described. Upon expiration of the interval (operation 401), the proxy monitor polls the proxy to determine whether a result of the synchronous API invocation has been received by the proxy, as shown in operation 402. If a result has been received (operation 403), the result object can be returned to the application (operation 404), such as by writing the result to the appropriate memory location. If no result has been received upon expiration of the time interval, the monitor may check to determine whether it has reached the maximum number of monitoring cycles to monitor the proxy, as shown in operation 405. If the maximum number of intervals has been reached, the monitor can time out the proxy, as shown in operation 406. If the maximum number of intervals has not been reached, the monitor may continue to monitor the proxy and the process would loop back to operation 400.

Figure 5:
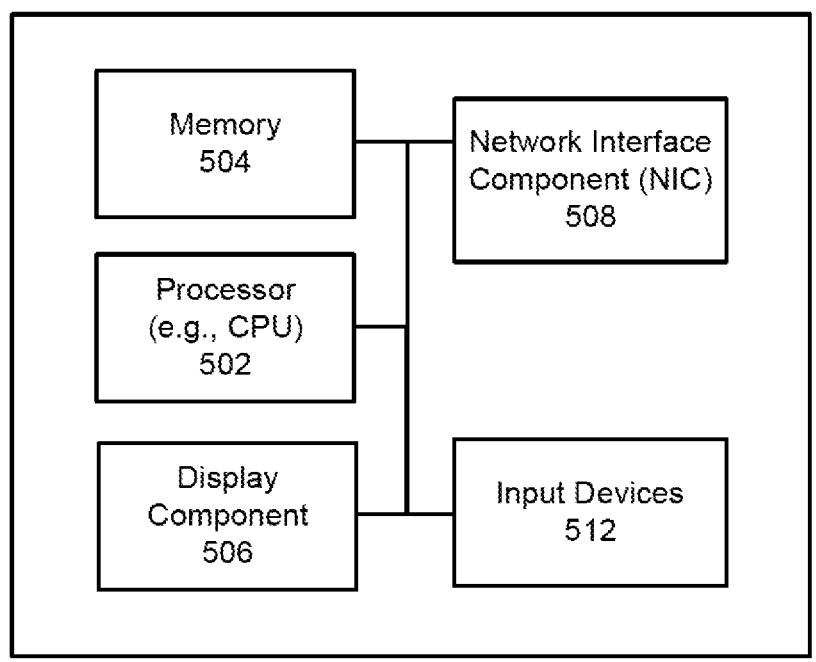
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in physical memory component 504. The memory component 504 can include many types of memory, data storage, or non-transitory computer-readable storage media, such as random access memory (RAM) storing program instructions for execution by the processor 502, a separate form of storage for images or data, a removable memory for sharing information with other devices and the like. The memory component 504 typically can further comprise a display component 506, such as a monitor, a touch screen, liquid crystal display (LCD), or the like. In various embodiments, the computing device will include at least one input device 512 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 508 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP, HTTP/HTTPS or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or % wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for executing synchronous application programming interface (API) calls, said method comprising:
   receiving, in an application, an invocation of a synchronous application programming interface (API), wherein the synchronous API is configured to block a caller of the invocation until a result of the invocation is returned;
   creating a proxy by the application, the proxy configured to execute the invocation of the synchronous API;
   executing the invocation of the synchronous API by the proxy, whereby the application is released from waiting for the result of the invocation; and
   periodically monitoring the proxy by the application to determine when the invocation of the synchronous API has completed or has timed out.

2. The method of claim 1, wherein periodically monitoring the proxy further comprises:
   for a predetermined maximum number of time intervals, polling the proxy by the application upon expiration of each time interval to determine whether a result of the synchronous API has been returned.

3. The method of claim 2, wherein periodically monitoring the proxy further comprises:
in response to detecting that a result of the synchronous API has been returned, returning the result from the proxy to the application; otherwise
in response to detecting that the maximum number of time intervals has been reached, terminating the proxy.

4. The method of claim 1, wherein the application instantiates the proxy and obtains a handle to the proxy, the handle used to communicate inputs and results between the application and the proxy.

5. The method of claim 1, wherein the proxy is a separate thread, child or sub-process executing concurrently or in parallel with the application.

6. The method of claim 1, wherein the application reuses the proxy for one or more subsequent invocations of the synchronous API if the proxy successfully returned the result of the synchronous API, otherwise if the proxy terminated without returning the result, the application instantiates a new instance of the proxy.

7. The method of claim 1, wherein the application executes multiple synchronous APIs in parallel.

8. A computing device, comprising:
at least one processor; and
memory including instructions that, when executed by the at least one processor, cause the at least one processor to:
receive, in an application, an invocation of a synchronous application programming interface (API), wherein the synchronous API is configured to block a caller of the invocation until a result of the invocation is returned;
create a proxy by the application, the proxy configured to execute the invocation of the synchronous API;
execute the invocation of the synchronous API by the proxy, whereby the application is released from waiting for the result of the invocation; and
periodically monitor the proxy by the application to determine when the invocation of the synchronous API has completed or has timed out.

9. The computing device of claim 8, wherein periodically monitoring the proxy further comprises:
for a predetermined maximum number of time intervals, polling the proxy by the application upon expiration of each time interval to determine whether a result of the synchronous API has been returned.

10. The computing device of claim 9, wherein periodically monitoring the proxy further comprises:
in response to detecting that a result of the synchronous API has been returned, returning the result from the proxy to the application; otherwise
in response to detecting that the maximum number of time intervals has been reached, terminating the proxy.

11. The computing device of claim 8, wherein the application instantiates the proxy and obtains a handle to the proxy, the handle used to communicate inputs and results between the application and the proxy.

12. The computing device of claim 8, wherein the proxy is a separate thread, child or sub-process executing concurrently or in parallel with the application.

13. The computing device of claim 8, wherein the application reuses the proxy for one or more subsequent invocations of the synchronous API if the proxy successfully returned the result of the synchronous API, otherwise if the proxy terminated without returning the result, the application instantiates a new instance of the proxy.

14. The computing device of claim 8, wherein the application executes multiple synchronous APIs in parallel.

15. A non-transitory computer readable storage medium comprising one or more sequences of instructions, the instructions when executed by one or more processors causing the one or more processors to execute the operations of:
receiving, in an application, an invocation of a synchronous application programming interface (API), wherein the synchronous API is configured to block a caller of the invocation until a result of the invocation is returned;
creating a proxy by the application, the proxy configured to execute the invocation of the synchronous API;
executing the invocation of the synchronous API by the proxy, whereby the application is released from waiting for the result of the invocation; and
periodically monitoring the proxy by the application to determine when the invocation of the synchronous API has completed or has timed out.

16. The non-transitory computer readable storage medium of claim 15, wherein periodically monitoring the proxy further comprises:
for a predetermined maximum number of time intervals, polling the proxy by the application upon expiration of each time interval to determine whether a result of the synchronous API has been returned.

17. The non-transitory computer readable storage medium of claim 16, wherein periodically monitoring the proxy further comprises:
in response to detecting that a result of the synchronous API has been returned, returning the result from the proxy to the application; otherwise
in response to detecting that the maximum number of time intervals has been reached, terminating the proxy.

18. The non-transitory computer readable storage medium of claim 15, wherein the application instantiates the proxy and obtains a handle to the proxy, the handle used to communicate inputs and results between the application and the proxy.

19. The non-transitory computer readable storage medium of claim 15, wherein the proxy is a separate thread, child or sub-process executing concurrently or in parallel with the application.

20. The non-transitory computer readable storage medium of claim 15, wherein the application reuses the proxy for one or more subsequent invocations of the synchronous API if the proxy successfully returned the result of the synchronous API, otherwise if the proxy terminated without returning the result, the application instantiates a new instance of the proxy.

* * * * *